(12) United States Patent
Barany et al.

(10) Patent No.: US 6,839,356 B2
(45) Date of Patent: Jan. 4, 2005

(54) SYSTEM AND METHOD FOR CONTROLLING A WIRELESS PACKET SWITCHED VOICE CALL

(75) Inventors: Peter Barany, McKinney, TX (US); Chandra Sekhar Bontu, Nepean (CA); Marvin Blenn, Dallas, TX (US)

(73) Assignee: Nortel Networks Limited, St. Laurent (CA)

(*) Notice: Subject to any disclaimer, the term of this patent is extended or adjusted under 35 U.S.C. 154(b) by 874 days.

(21) Appl. No.: 09/789,435

(22) Filed: Feb. 20, 2001

(65) Prior Publication Data

US 2001/0043577 A1 Nov. 22, 2001

Related U.S. Application Data

(60) Provisional application No. 60/183,940, filed on Feb. 22, 2000.

(51) Int. Cl.[7] .............................................. H04L 12/56
(52) U.S. Cl. ....................... 370/401; 370/352; 709/247; 379/38.17
(58) Field of Search .......................... 370/329, 352–356, 370/400, 401; 709/247; 379/88.17

(56) References Cited

U.S. PATENT DOCUMENTS 6,614,781 B1 * 9/2003 Elliott et al. ................. 370/352
6,640,248 B1 * 10/2003 Jorgensen .................... 709/226

* cited by examiner

*Primary Examiner*—John Pezzlo
(74) *Attorney, Agent, or Firm*—Bruce Garlick; Garlick, Harisson & Markison

(57) ABSTRACT

A wireless network and serviced mobile station manages VOIP telephony calls by incorporating control information into VOIP datagrams. The control information includes an indication of the data rate of the VOIP payload of the VOIP datagram, the quality of the VOIP payload, requested data rates for subsequent VOIP datagrams, and whether the VOIP payload contains a "silent" VOIP payload. To avoid conflicting with particular datagram requirements, the control information is inserted into the VOIP datagram between the VOIP datagram and the VOIP payload. A base station servicing the wireless link may override the requested data rate and/or the commanded data rate in order to manage its available wireless bandwidth among a plurality of mobile stations. The frame quality indicator may be set by the servicing physical/mac/link layer(s) of the base station or mobile station to indicate that the VOIP payload was not correctly received.

46 Claims, 10 Drawing Sheets

SYSTEM AND METHOD FOR CONTROLLING A WIRELESS PACKET SWITCHED VOICE CALL

CROSS-REFERENCE TO RELATED APPLICATION

The present application claims priority pursuant to 35 U.S.C. Sec 119(e) to U.S. Provisional Application Ser. No. 60/183,940, filed Feb. 22, 2000, which is hereby incorporated by reference in its entirety.

BACKGROUND

1. Technical Field

The present invention relates generally to cellular wireless communication networks; and more particularly to packetized voice communications in such a cellular wireless communication network.

2. Related Art

Wireless networks are well known. Cellular wireless networks support wireless communication services in many populated areas of the world. Satellite wireless networks are known to support wireless communication services across most surface areas of the Earth. While wireless networks were initially constructed to service voice circuit-switched voice communications, they are now called upon to support packet-switched data communications as well.

The transmission of data communications within a wireless network places different demands on networks than does the transmission of voice communications. Voice communications require a sustained bandwidth with minimum signal-to-noise ratio (SNR) and continuity requirements. Data communications, on the other hand, typically are latency tolerant but have higher total throughput requirements. Conventional circuit-switched wireless networks were designed to support the well-known voice communication requirements. Thus, wireless networks (as well as conventional circuit switched telephone networks) have been adapted to service data communications, with such adaptation providing mixed results. Thus, future wired and wireless networks will likely be fully packet switched.

Packet switched data networks, e.g., the Internet, were originally constructed to service only data communications. However, these networks have been adapted to service packetized voice communications as well, e.g., Voice Over Internet Protocol (VOIP) telephony. VOIP telephony is fully packet switched, with each VOIP packet including a digitized voice payload. Packet switched networks, which were designed to service data communications and not voice communications, often do not satisfy the requirements of VOIP telephony. Thus, safeguards must be set in place in the network infrastructure to guarantee the minimum sustained bandwidth and continuity requirements of VOIP telephony. These safeguards have been substantially identified for wired networks but not for wireless networks.

With the advent of fully packet-switched wireless networks, VOIP telephony must also be adapted for use in such wireless networks. However, the operational limitations of wireless networks differ significantly from those of wired networks. In servicing a VOIP telephony call, sufficient bandwidth must be allocated and the bandwidth allocation must be serviced with a maximum latency. Wireless networks are generally predictable and can be operated to meet these constraints. However, the uncertainty and constantly changing nature of wireless links often compromises not only the bandwidth requirement but also the maximum latency requirements. These problems are compounded with VOIP telephony because control of the VOIP telephone call is controlled at a relatively high level on the ISO protocol stack.

A particular wireless link between a base station and mobile station varies in quality such that it will support differing data rates at differing times. As a mobile station moves farther away from the base station, the data rate supported by the wireless link will decrease. Further, as wireless interference increases, the data rate supported by the wireless link also decreases. Currently, VOIP telephony supports a fixed data rate for the pendency of a serviced VOIP call. Thus, VOIP telephony calls are not as easily serviced as are conventional circuit switched calls.

Because base station must service a plurality of mobile stations, each base station must judiciously allocate its available bandwidth to a plurality of wireless links. The fixed data rate requirement of VOIP calls may not allow the base station to flexibly manage the requirements of all serviced mobile terminals.

Further, wireless link may be noisy, VOIP telephony packets may be corrupted on their transmission across the wireless links, both on the forward wireless links and the reverse wireless links. VOIP telephony operation fails to address such noisy/erroneous operations. Thus, VOIP calls serviced across the wireless link may include errors that produce only noise when converted to an analog equivalent.

Moreover, VOIP telephony provides no flexibility in managing resources during quite periods. All telephony calls include quiet periods in which no party is speaking. During these quiet periods, VOIP calls carry data at the same rate as during active periods. The transmission of data during these quiet periods consumes wireless link bandwidth but produces no benefits.

Thus, it would therefore be desirable to control packet switched telephony calls, e.g., VOIP calls, so that the wireless link may be more flexibly managed.

SUMMARY OF THE INVENTION

A wireless network and serviced mobile station constructed according to the present invention efficiently manage VOIP telephony calls by incorporating control information into VOIP datagrams. The control information includes an indication of the data rate of the VOIP payload of the VOIP datagram, the quality of the VOIP payload, requested data rates for subsequent VOIP datagrams, and whether the VOIP payload contains a "silent" VOIP payload. To avoid conflicting with particular datagram requirements, the control information is inserted into the VOIP datagram between the VOIP datagram header and the VOIP payload. Various application layer datagrams may be modified to carry this control information, e.g., Real-Time Transport Protocol, Real-Time Transport Control Protocol, etc. In one particular embodiment, the control information contains eight bits of information and forms octet 0 that precedes the VOIP payload octets 1 through N.

The VOIP datagram control information provides significant advantages when servicing VOIP telephony across the wireless link of a wireless network. By indicating the data rate of the VOIP payload, a serving Adaptive Multirate (AMR) coder/decoders (AMR CODEC) may efficiently decode the VOIP payload using a minimal resource set. Because coding operations consume significant battery life, by having the AMR CODEC of a mobile station operate only when required, battery life is extended. Moreover, offloading processing resources from the VOIP call allows the AMR CODEC to perform other decoding/encoding functions.

By supporting a plurality of data rates, the data rate may be adjusted so that it is commensurate with the quality of the wireless link supporting the VOIP call. For each VOIP datagram received by a mobile station from its servicing base station on the forward link, the control information includes a data rate that is to be employed by the mobile link in creating the VOIP payload of the next reverse link datagram. Further, for each VOIP datagram created by the mobile station and transmitted on the reverse link to the base station, the mobile station inserts control information to indicate at what data rate (requested data rate) it desires to receive subsequent forward link VOIP datagrams.

In prior circuit-switched wireless networks, a conversing circuit-switched terminal either created subsequent speech frames for the mobile station at this requested data rate or a base station altered the requested data rate in order to manage its available wireless bandwidth and interference levels among a plurality of mobile stations. A serviced mobile station may request that data be sent at a lower data rate as it moves into the fringe of a cell where channel quality is lesser. However, due to the mobile station's received signal strength measured by the servicing base station, the servicing base station may decide to override the request and direct that the data rate be kept at a higher level. Further, for forward link transmissions, the base station may override the commanded data rate to a lower (or higher) data rate, depending upon the wireless link conditions. The inclusion of a code mode request/command indicator in the control information of the VOIP datagram makes this override functionality possible for packet-switched wireless voice communications.

The control information of the VOIP datagram may also include a frame quality indicator that indicates whether the frame contains good or corrupted data. Because of the rate at which VOIP datagrams are required by the various VOIP standards, e.g., H.323, SIP, RTP, etc., VOIP datagrams must be provided at a standardized rate. However, because of the nature of the wireless link servicing the VOIP call, the VOIP payload may be corrupted. Thus, according to the present invention, the control information includes the frame quality indicator, which may be set by the servicing physical/mac/link/network/transport/application layer(s) to indicate that the VOIP payload was not correctly received. This information is then employed by a servicing application to enact correction operations.

For forward link transmissions from the base station to the mobile station, the physical/mac/link/network/transport/application layer(s) serviced by the mobile station determine whether the frame is good or bad and, if the frame is bad, alters the control information to indicate the bad frame. For reverse link transmissions from the mobile station to the base station, the base station determines whether the VOIP datagram is good or bad, and if the frame is bad, the base station alters the control information to indicate the bad frame.

The control information may also indicate whether the VOIP payload contains silence description information (i.e., comfort noise) to be decoded. In this fashion, TX_TYPE and RX_TYPE functionality may be provided for the VOIP call. By providing this type of functionality, AMR CODEC resources may be freed for either other coding/decoding operations or to lower interference, or to conserve battery life.

Other features and advantages of the present invention will become apparent from the following detailed description of the invention made with reference to the accompanying drawings.

Acronyms

The following acronyms will be employed in conjunction with the description of the present invention:

2G—Referring to a legacy Circuit Switched network infrastructure or a legacy mobile terminal that supports circuit switched operations.

3GPP—Third Generation Partnership Project operations (and related body of standard operating procedures, such operations, and systems that support such operations)

3G—Referring to a next generation Packet Switched network infrastructure or a mobile terminal that supports packet switched services, including packet switched voice communications.

AMR Adaptive Multi-Rate
BSS Base Station System
CCF—Call Control Functions
CSCF—Call State Control Functions
CMC Codec Mode Command
CMR Codec Mode Request
DTX Discontinuous Transmission
EDGE Enhanced Data Rates for Global Evolution
EGPRS Enhanced General Packet Radio Service
EIR Equipment identity register
IF1 Interface Format 1
IF2 Interface Format 2
IF3 Interface Format 3
GERAN/UTRAN GSM/EDGE Radio Access Network
GSN GPRS Support Node
GGSN Gateway GPRS Support Node
GPRS General Packet Radio Service
GSM Global System for Mobile Communications
GTP A tunnel control and management protocol which allows the SGSN to provide GPRS network access for an MS
GMSC Gateway Mobile Switching Center
HLR Home Location Register
HSS Home Subscriber Service
IP Internet Protocol
ICGW Incoming Call Gateway
IWMSC Interworking MSC
LSB Least Significant Bit
MAP Mobile Application Part
MGCF Media Gateway Control Function
MGW Media Gateway Function
MM Multimedia
MRF Multimedia Resource Function
MS Mobile Station
MSB Most Significant Bit
MSC Mobile Switching Center
PSTN Public switched telephone network
PLMN Public Land Mobile Network
QoS Quality of Service
RAB Radio Access Bearer
R-SGW Roaming Signaling Gateway Function
RPE Regular Pulse Excitation
RT Real-Time
RTFACCH Real-Time Fast Associated Control Channel RTP Real-Time Transport Protocol
RTCP RTP Control Protocol
SCP Service Control Point
SGSN Serving GPRS Support Node
SPD Serving Profile Database
SID Silence Descriptor
T-SGW Transport Signaling Gateway Function
UB Unused Bit
Um Wireless link between GERAN/UTRAN base station and Mobile Station
UMTS Universal Mobile Telecommunications System
UDP User Datagram Protocol
UTRAN UMTS Terrestrial Radio Access Network
VLR Visitor Location Register
WBCMDA Wide Band CDMA

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
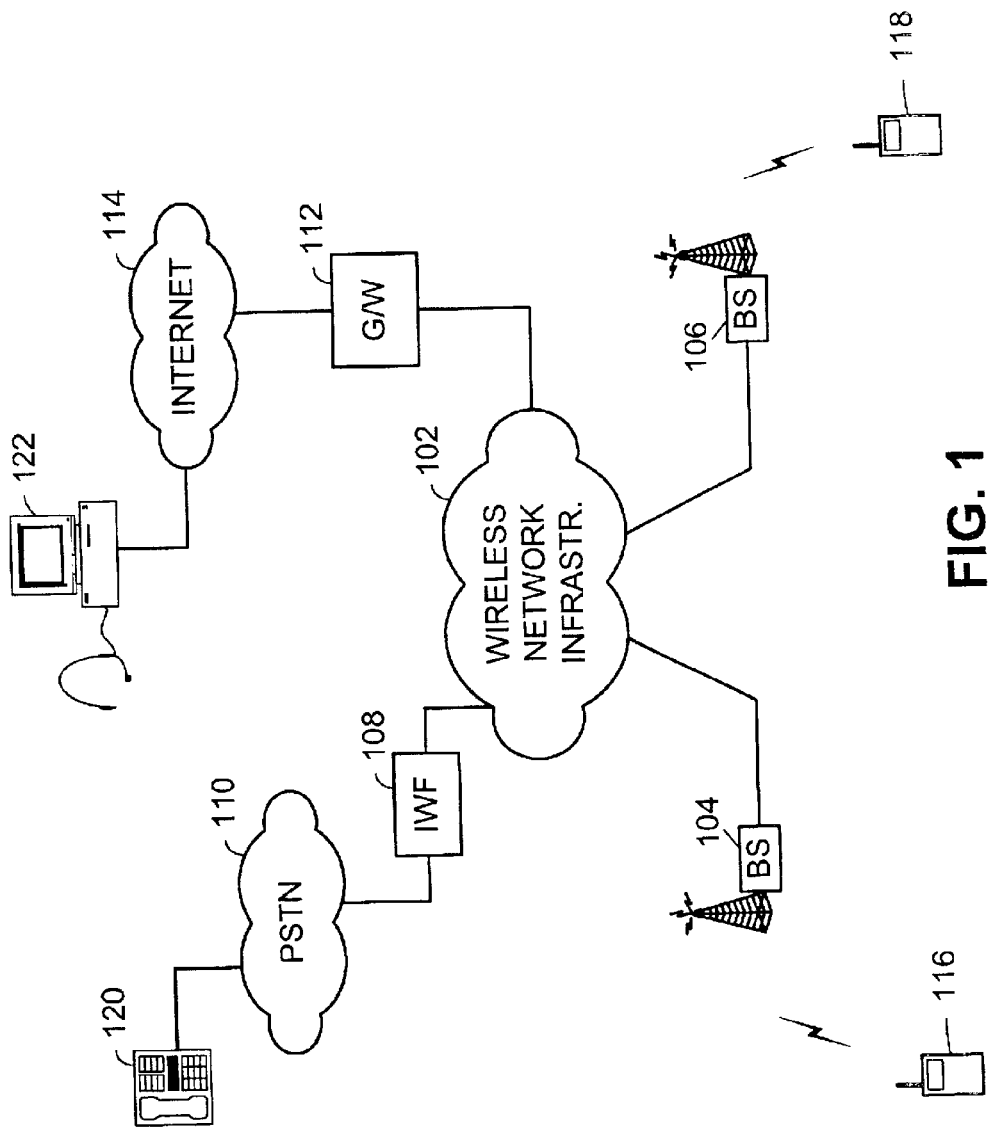
FIG. 1 is a system diagram illustrating a portion of a cellular wireless network constructed according to the present invention.

FIG. 1 is a system diagram illustrating a portion of a cellular wireless network constructed according to the present invention. The cellular wireless network includes a wireless network infrastructure 102, base station 104, and base station 106. The cellular wireless network supports VOIP telephony according to an industry standard, e.g., H.323, SIP, RTP, etc., that has been further modified according to the present invention. The wireless network infrastructure 102 couples to the Internet 114 via a gateway (G/W) 112. A Voice Over Internet Protocol (VOIP) terminal 122 also couples to the Internet 114. The wireless network infrastructure 102 couples to the Public Switched Telephone Network (PSTN) 110 via an interworking function (IWF, or VOIP G/W) 108. A conventional voice terminal 120 couples to the PSTN 110.

Each of the base stations 104 and 106 services a cell/set of sectors within which it supports wireless communications with a plurality of mobile stations (MSs), e.g., MS 116 and MS 118. MSs 116 and 118 support VOIP telephony. Thus, wireless links having both forward link components and reverse link components, the base stations 104 and 106 support VOIP calls either initiated by the MSs 116 118 or terminated to the MSs 116 and 118. The wireless links operates according to an industry standard, e.g., IS-95B, IS-2000, 3GPP, etc. so that interoperability among devices of differing manufacturers exists.

In one example, a VOIP call is setup and serviced between MS 116 and VOIP terminal 122. Thus, in this example, the VOIP call transmission path includes the wireless link between the MS 116 and the base station 104 and the wired link between the base station 104 and the VOIP terminal 122 that includes the wireless network infrastructure 102, the G/W 112, and the Internet 114. Both the MS 116 and the VOIP terminal 122 include a coder/decoder (AMR CODEC). In the particular example illustrating the present invention, the AMR CODEC is an adaptive multirate (AMR) AMR CODEC that supports a plurality of data rates. The function of the AMR CODEC is to encode an analog voice signal into a VOIP payload, and to decode a VOIP payload into an analog voice signal. Additional components of the MS 116 and the VOIP terminal 122, e.g., speakers and microphones, present the analog voice signal to the users and receive the analog voice signal from the users.

Thus, for a speech received from the user of MS 116, the AMR CODEC within MS 116 encodes the speech and the AMR CODEC within VOIP terminal 122 decodes the speech. Further, for speech received from the user of VOIP terminal 122, the AMR CODEC within VOIP terminal 122 encodes the speech and the AMR CODEC within MS 116 decodes the speech. For an ongoing VOIP telephony call, therefore, both AMR CODECs will continually operate to support the call.

In this example, the quality of the wireless link between base station 104 and MS 116 changes over time. Further, requirements placed upon the base station also vary over time, e.g., the number of serviced MSs, the requirements of each MS, etc. Thus, in order to compensate for these changing demands and the quality of the wireless link, the base station 104 and the MS 116 control the characteristics of the VOIP call. Adjusting control information contained in each VOIP datagram indicates the manner in which the VOIP call is controlled. The control information include (1) the data rate of the VOIP payload of the VOIP datagram, (2) indications of the quality of the VOIP payload of the VOIP datagram, (3) indications of whether the VOIP payload includes silence description information (i.e., comfort noise) data, and (4) indications of requested data rates and commanded data rates for subsequent VOIP payloads.

Because the header of the VOIP datagram is fixed by operating standards, the control information is inserted between the VOIP datagram header and the VOIP payload. In a described embodiment, the control information is indicated as octet 0 of the VOIP payload, even though the control information does not represent the carried speech. As will be further described with reference to FIGS. 4A and 4B, the control information is eight bits in length, includes three AMR CODEC Mode Request (CMR) AMR CODEC Mode Command (CMC) bits that indicate future VOIP payload data rates, a Frame Quality Indication (FQI) bit, and three Frame Type Indicator (FTI) bits that indicate current VOIP payload data rates. However, in other embodiments, the number and type of bits will differ.

In an operation according to the present invention, the MS 116 encodes a user's speech, sets the control information accordingly, forms a VOIP datagram that includes a VOIP header, the control information, and the VOIP payload, and transmits the VOIP datagram to the base station 104. The base station 104 relays the VOIP datagram to the VOIP terminal 122, the VOIP terminal 122 decodes the VOIP datagram based upon the control information, and the VOIP terminal 122 presents the decoded voice to the user of the VOIP terminal 122. This operation is performed in reverse with the VOIP terminal 122 creating the VOIP datagram and sending the VOIP datagram to the MS 116. These operations are also performed according to the present invention for any two terminals supporting VOIP telephony, e.g., for MS 116 and telephone 120, for MS 116 and MS 118, etc.

In another operation according to the present invention, the base station 116 modifies the control information within the VOIP datagram to compensate for wireless link conditions and to meet its other operating requirements. For example, if a VOIP datagram is not properly received from the MS 116 due to wireless reverse link quality, the base station 104 modifies the control information to indicate that the VOIP payload is corrupt. Then, when the VOIP terminal 122 receives the VOIP datagram, it performs speed frame substitution, e.g., presenting the prior decoded VOIP payload to the user.

This operation may also be performed by the MS 116 for corrupt VOIP datagrams that it receives. Upon receipt of the VOIP datagram, prior to passing the VOIP datagram to its AMR CODEC for decoding, the MS 116 alters the control information to indicate that the VOIP datagram is corrupt. The AMR CODEC of the MS 116 may then perform speech frame substitution operations to compensate for the corrupt VOIP payload. This not only improves voice quality but also conserves battery life by eliminating unnecessary decoding operations.

In another operation according to the present invention, the data rates requested by the MS 116 are altered by the base station 104 to compensate for other requirements placed upon the base station 104. For example, as the MS 116 moves to the fringes of a cell serviced by the base station 104, its channel quality decreases. To compensate for this decrease in channel quality, the MS 116 requests, in a VOIP datagram, that the VOIP terminal 122 reduce the data rate of the VOIP payload in the next VOIP datagram it transmits to the MS 116. However, in an operation according to the present invention, the base station 104 determines that the data rate is inconsistent with current conditions and alters this requested data rate to decrease the bandwidth consumed by the transmission, i.e., increases the requested data rate.

A similar operation is performed for VOIP datagrams transmitted from the base station 104 to the MS 116 on the forward link. The base station 104 intercepts VOIP datagrams transmitted from the VOIP terminal 122 and intended for the MS 116. The base station 104 considers the data rate requested by the VOIP terminal 122 and determines whether the reverse wireless link will support this data rate and/or whether current system condition systems are consistent with this data rate. If so, the base station 104 does not change the requested/commanded data rate. However, if conditions dictate, the base station 104 alters the requested/commanded data rate to a data rate consistent with current wireless system conditions. For example, if wireless loading within adjacent cell/sector(s) is high, the base station 104 may command the MS 116 to code the VOIP payload at a lower rate (thereby increasing the channel coding/error protection) to make the link more robust to high interference conditions.

Figure 2:
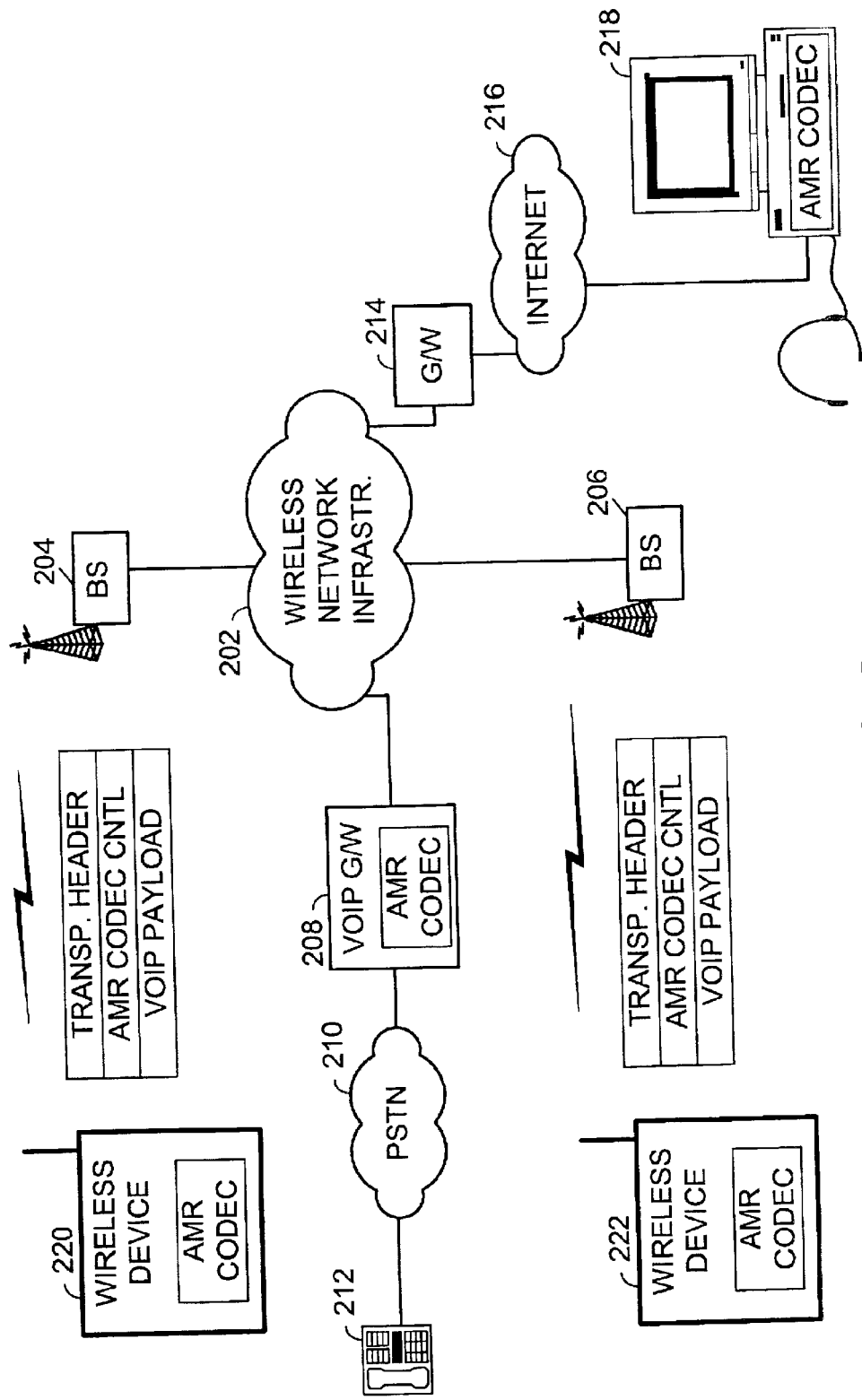
FIG. 2 is a system diagram illustrating a portion of a cellular wireless network in which the operation of adaptive multirate coder/decoders is controlled according to the present invention.

FIG. 2 is a system diagram illustrating a portion of a cellular wireless network in which the operation of AMR CODECs is controlled according to the present invention. The cellular wireless network includes a wireless network infrastructure 202 and base stations 204 and 206. The wireless network infrastructure 202 couples to the Internet 216 via a VOIP G/W 216. A VOIP terminal 218 also couples to the Internet 216, the VOIP terminal is instantiated on a Personal Computer (PC). The wireless network infrastructure 202 couples to the PSTN 210 via an IWF 208. A conventional voice terminal 212 couples to the PSTN 210.

Each of the base stations 204 and 206 services a cell/set of sectors within which it supports wireless communications with a plurality of mobile stations (MSs), e.g., MS 220 and MS 222, which support VOIP telephony. Thus, upon a wireless link having both a forward link component and a reverse link component, the base station 204 supports a VOIP call either initiated by the MS 220 or terminated to the MS 220. Further, the base station 206 supports a VOIP call either initiated by the MS 222 or terminated to the MS 222.

Each terminal device supporting VOIP telephony also includes an AMR CODEC, e.g., MS 220, MS 222, VOIP G/W 208, and VOIP terminal 218. Each AMR CODEC is responsive to the control information when converting between VOIP payload and speech information contained therein. Further, the VOIP terminals set the control information in conjunction with the operations of the AMR CODECS that have been performed in creating the VOIP payload.

As is illustrated, each VOIP datagram includes the VOIP datagram header, the control information, and the VOIP payload. The VOIP datagram may be consistent with various standardized formats, e.g., RTP, RTCP, IP, etc, that has been altered according to the present invention. These formats will be described further with reference to FIGS. 6A, 6B, and 7.

Figure 3:
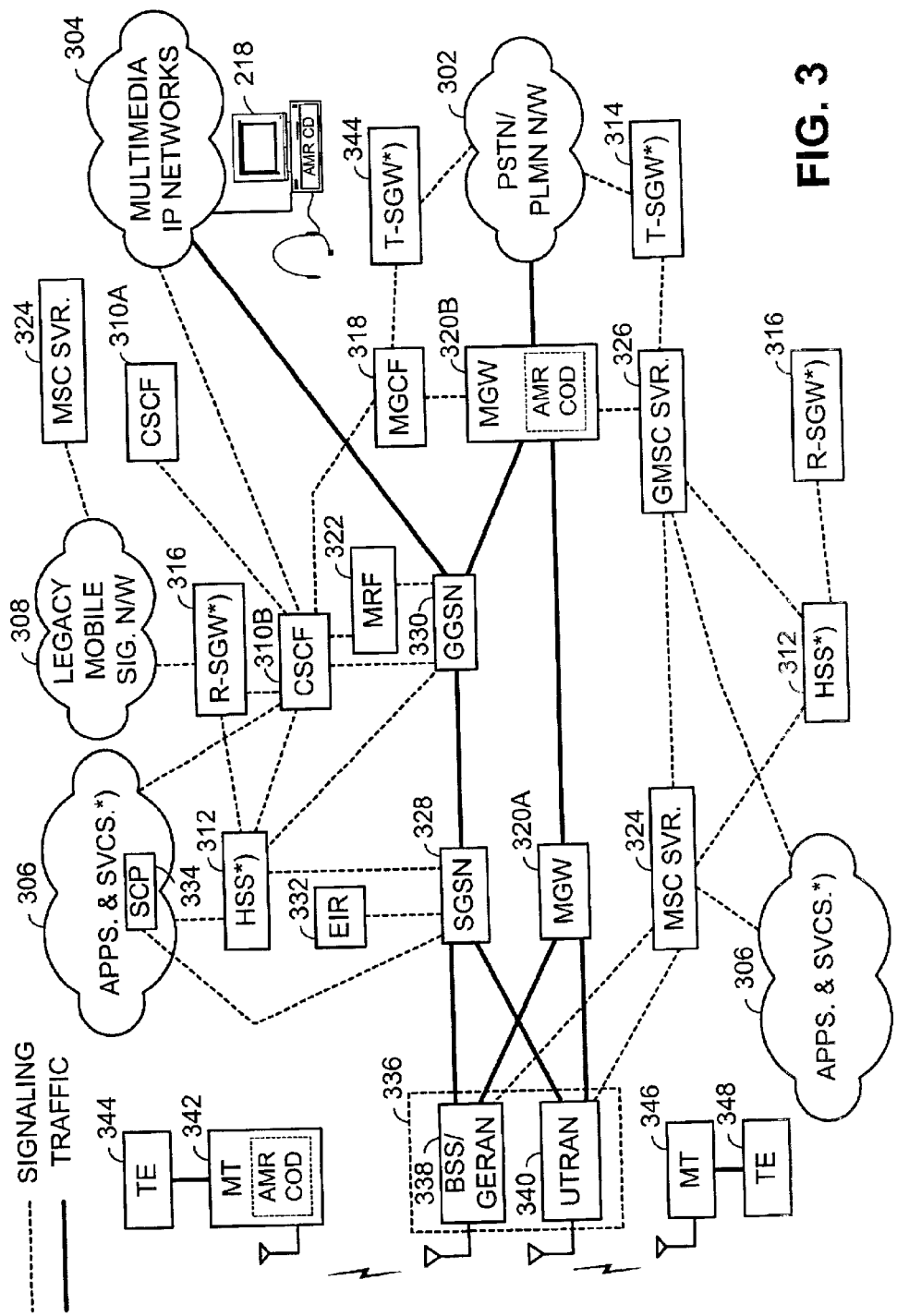
FIG. 3 is a system diagram illustrating a portion of a next generation (3G packet switched) cellular wireless communication system in which the present invention is employed to control the operation of adaptive multirate AMR CODECS.

FIG. 3 is a system diagram illustrating a portion of a next generation (3G packet switched) cellular wireless communication system in which VOIP telephony is supported according to the present invention. The system of FIG. 3 operates according to next generation (3G) standards that will replace, in some cases, prior 2G standards. Generally speaking, the next generation 3G standards are for a completely packet switched system. While prior 2G systems support a combination of packet switched and circuit switched operations, the 3G infrastructure is fully packet switched. For a general description of 2G systems, refer to GSM standards documents published by the ETSI of Valbonne, France. In particular, the document ETSI EN 301 344 V7.4.0 (2000-03) describes prior art operations within a legacy 2G wireless communication system. 3G operations were not fully developed at the time of the present filing.

The system of FIG. 3 provides wireless communications support for mobile terminals 342 and 346. In providing wireless communications, the system may route control signals and communications from and to a plurality of coupled networks, including a Public Switched Telephone Network (PSTN) and/or GSM public land mobile network (PLMN, in combination PSTN/PLMN) 302, multimedia IP networks 304, application and services networks 306 and a legacy mobile signaling network 308. Some of the components of FIG. 3, including the application and services network 306 are shown twice. Such is the case to minimize confusion in the intercoupling of elements. When a component is shown twice in FIG. 3, the name of the elements concludes with "*)", such as the application and services network 306, which includes at least one Service Control Point (SCP) 334. Of the connections shown in FIG. 3, solid lines represent traffic paths while dotted lines represent signaling paths.

Call State Control Functions (CSCFs) 310A and 310B consist of two components: the Serving CSCF and the Interrogating CSCF. The Interrogating CSCF is used in determining how to route mobile terminated calls. For mobile terminated communications, both Serving CSCF and Interrogating CSCF functionality are typically involved. For mobile originated communications, the Interrogating CSCF functionality is not required. Both the Serving CSCF and Interrogating CSCF functionality may be provided within a single network infrastructure element.

The CSCF 310B provides Incoming Call Gateway (ICGW) functionality, Call Control Functions (CCFs), Serving Profile Database (SPD) functions, and Address Handling functions. In providing the ICGW functions, the CSCF 310B acts as a first entry point to the system and performs routing of incoming calls. In performing the ICGW function, the CSCF 310B performs incoming call triggering operations, e.g., call screening, call forwarding, etc. The CSCF 310B also interacts with other system components to perform query address handling operations. In some of these operations, the CSCF 310B communicates with the HSS 312.

In providing the CCFs, the CSCF 310B provides call setup, termination, and state/event management. The CSCF 310B interacts with the MRF 322 in order to support multi-party and other services. The CSCF 310B also reports call events for billing, auditing, intercepting, and for other call event purposes. In performing CCFs, the CSCF 310B also receives and processes application level registration requests and performs various other functions.

The CSCF 310B maintains and manages the SPD. For a serviced subscriber, the CSCF 310B interacts with the HSS 312 of the home domain of the subscriber and receives profile information an all-IP network user. The CSCF 310B stores some of the profile information in the SPD. Upon an access of the system, the CSCF 310B notifies the subscriber's home domain of the initial access. The CSCF 310B may cache access related information e.g., terminal IP address (es) where the subscriber may be reached, etc.

In providing the address handling functions, the CSCF 310B performs analysis, translation, modification if required, address portability, and mapping of alias addresses. The CSCF 310B may also perform temporary address handling for inter-network routing.

The Home Subscriber Service (HSS) 312 is the master database for a given subscriber. It is the entity containing the subscription related information to support the network entities handling calls/sessions. As an example, the HSS 312 could provide support to the call control servers in order to complete the routing/roaming procedures by solving authentication, authorization, naming/address resolution, location dependencies, etc.

The HSS 312 is responsible for storing and managing the following subscriber related information: (1) Subscriber Identification, Numbering and addressing information; (2) User Security information, e.g., Network access control information for authentication and authorization; (3) User Location information at inter-system level (HSS 312 handles the user registration, and stores inter-system location information, etc.); and (4) The subscriber profile, e.g., services supported, service specific information, etc. Based upon this subscriber information, the HSS 312 is also responsible for supporting the call control and short message entities of the different control systems, e.g., circuit switched domain control, packet switched domain control, IP multimedia control, etc., offered by the system operator.

The HSS 312 may integrate heterogeneous information, and enable enhanced features in the core network to be offered to the application and services domain while, at the same time hiding the heterogeneity of the system. The HSS 312 consists of the following functionalities: (1) user control functions required by the IM CN subsystem; (2) a subset of prior generation Home Location Register (HLR) functionality required for the packet-switched domain; and (3) circuit-switched portion of the prior generation HLR, if it is desired to enable subscriber access to the circuit-switched domain or to support roaming to legacy GSM/UMTS circuit-switched domains.

In its normal operations, the HSS 312 performs: (1) Management Application Protocol (MAP) termination; (2) Addressing protocol termination; (3) Authentication, Authorization protocol termination; and (4) IP Multimedia (MM) Control Termination. In performing the MAP termination, the HSS 312 terminates the MAP protocol as described in the MAP specification by performing user location management procedures, user authentication management procedures, subscriber profile management procedures, call handling support procedures (routing information handling), and SS related procedures.

In performing the addressing protocol termination, the HSS 312 terminates a protocol to solve addressing according to appropriate standards. In accomplishing this goal, the HSS 312 enacts procedures for subscriber name/numbers/addresses resolution. In performing authentication and authorization protocol termination, the HSS 312 terminates authentication and authorization protocols according to the appropriate standards. As an example of such operations, the HSS 312 performs subscriber authentication and authorization procedures for IP based multimedia services. Finally, in performing IP MM Control termination, the HSS 312 terminates the IP based MM call control protocol, according to appropriate standards. For example, in accomplishing this operation, the HSS 312 enacts user location management procedures for IP based multimedia services and performs IP based multimedia call handling support procedures.

The Transport Signaling Gateway Function (T-SGW) 314 is the PSTN/PLMN termination point for the network infrastructure. In operation, the T-SGW 314 maps call related signaling from/to the PSTN/PLMN 302 on an IP bearer channel and relays the signaling to/from the MGCF 318. In addition to this function, the T-SGW 314 performs transport level mapping between the PSTN/PLMN 302 and the IP protocol.

The Roaming Signaling Gateway Function (R-SGW) 316 relates only to roaming between circuit switched networks and GPRS domain networks and between 3G UMTS teleservices domains and the UMTS GPRS domain. In order to ensure proper operations during roaming, the R-SGW 316 performs signaling conversion at the transport level between the legacy SS7 based signaling transport and IP based signaling transport. The R-SGW 316 does not interpret the MAP/CAP message but may have to interpret the underlying SCCP layer to ensure proper routing of the signaling. To support 2G mobile terminals, the R-SGW 316 performs interworking functions between the SS7 based signaling transport and the IP base signaling transport of MAP_E and MAP_G.

The Media Gateway Control Function (MGCF) 318 is the PSTN/PLMN termination point for the network infrastructure and its operation is consistent with existing/ongoing industry protocols/interfaces. In performing its functions, the MGCF 318 controls the parts of the call state that pertain to connection control for media channels in a MGW.

The Media Gateway Function (MGW) 320A and 320B is the PSTN/PLMN 302 transport termination point for the network infrastructure. The functions provided by the MGW 320A and 320B are consistent with the existing/ongoing industry protocols/interfaces that required for interoperability. The MGW 320A or 320B may terminate bearer channels from the PSTN/PLMN 302. The MGW 320A or 320B may also support media conversion, bearer control, and payload processing (e.g., AMR CODEC, echo canceller, conference bridge, etc.) for support of different circuit switched services. The MGW 320A or 320B need not be co-located with the MSC server 324 nor do the resources of the MGW 320B need be associated with any particular MSC server 324. In a system constructed according to the present invention, any MSC server, e.g., 324 may request resources from any MGW, e.g., 320A or 320B. As is shown, the MGW 320B includes an advanced multirate AMR CODEC that is controlled according to the present invention.

The Multimedia Resource Function (MRF) 322 performs multiparty call and multimedia conferencing functions, similar to the functions of a Multipoint Control Unit (MCU) in an H.323 network. The MRF 322 is responsible for bearer control (with GGSN 330 and MGW 320A, 320B) in servicing a multiparty/multimedia conference. In such a service, the MRF 322 may communicate with the CSCF 310A or 310B for multiparty/multimedia conference session validation.

The MSC server 324 and the gateway MSC (GMSC) server 326 are highbred elements linking the system of the present invention to legacy 2G GSM networks. The MSC server 324 performs the call control and mobility control parts of a GSM/UMTS MSC. The MSC server 324 is responsible for the control of mobile originated and mobile terminated circuit-switched domain calls. The MSC server 324 terminates the user-network signaling and translates the signaling into the relevant network-network signaling. The MSC server 324 also contains a VLR to hold the subscriber's service data. The MSC server 324 also controls the parts of the call state that pertain to connection control for media channels in the MGW 320A/120B. The GMSC server 326 performs the call control and the mobility control parts of a GSM/UMTS GMSC.

Two GPRS service nodes (GSNs) are illustrated in FIG. 3—a Serving GSN (SGSN) 328 and a Gateway GSN (GGSN) 330. In order to integrate GPRS into the 3G architecture, GPRS support nodes have been introduced. GSNs are responsible for the delivery and routing of data packets between the mobile terminals 342 and 346 and the multimedia IP networks 304. The SGSN 328 is responsible for the delivery of data packets from and to the mobile terminals 346 and 342 within its service area. Its tasks include packet routing and transfer, mobility management (attach/detach and location management), logical link management, and authentication and charging functions. The location register of the SGSN 328 stores location information (e.g., current cell, current VLR) and user profiles (e.g., IMSI, address(es) used in the packet data network) of all GPRS users registered with this SGSN 328. Further, the SGSN 328 interfaces with the equipment identity register (EIR) 332, which stores information pertinent to the attached mobile terminals.

The GGSN 330 acts as an interface between the GPRS backbone network and the multimedia IP networks 304. The GGSN 330 converts the GPRS packets coming from the SGSN 328 into the appropriate packet data protocol (PDP) format (e.g., IP or X.25) and sends them out on the multimedia IP networks 304. In the other direction, PDP addresses of incoming data packets are converted and readdressed to the GSM address of the destination user by the GGSN 330. The readdressed packets are sent to the responsible SGSN 328. For this purpose, the GGSN 330 stores the current SGSN 328 address of the user and his or her profile in its location register. The GGSN 330 also performs authentication and charging functions.

In general, there is a many-to-many relationship between the SGSNs and the GGSNs. With these relationships, the GGSN 330 is the interface to the multimedia IP networks 304 for several SGSNs. Further, the SGSN 328 may route its packets over different GGSNs to reach different packet data networks. For ease in description, FIG. 3 only includes a single SGSN 328 and a single GGSN 330.

A GSM/EDGE Radio Access Network (GERAN/UTRAN) base station 338 and a UMTS Terrestrial Radio Access (UTRAN) base station 340 together support wireless communications for both a legacy 2G mobile terminal 346 and a 3G mobile terminal 342. The UTRAN base station 340 supports legacy (2G) UMTS wireless communications with the legacy mobile terminal 346 while the GERAN/UTRAN base station 338 supports wireless communications with the 3G mobile terminal 342. The 3G mobile terminal 342 supports VOIP telephony and includes an adaptive multirate AMR CODEC that is controlled according to the present invention. The 3G mobile terminal 342 may provide wireless communication support to terminal equipment 344, to which it provides wireless communication services. The legacy (2G) mobile terminal 346 couples to terminal equipment 348 for which it provides wireless communication services. The legacy mobile terminal 346 operates according to 2G standards, but interfaces with the 3G system of FIG. 3. Operations within the 3G system of FIG. 3 support the legacy mobile terminal 346.

Figure 4A:
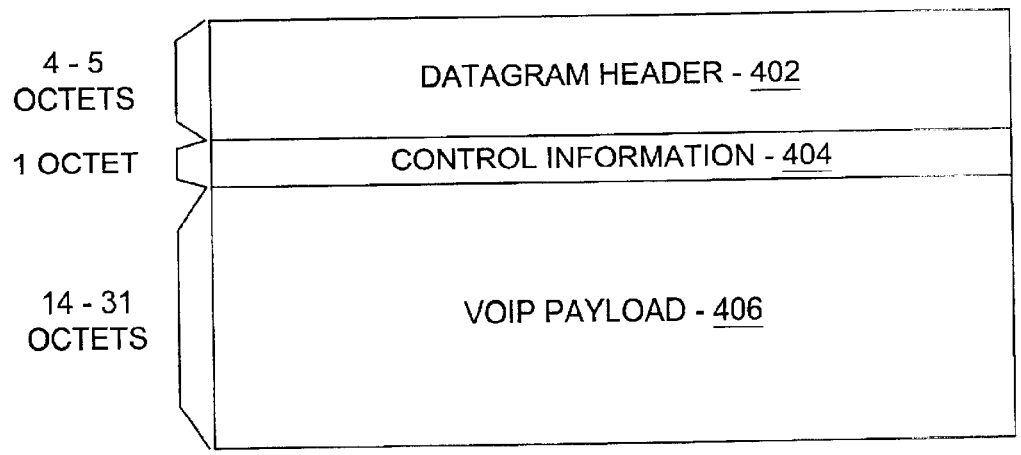
FIG. 4A is a block diagram illustrating the structure of VOIP datagrams according to the present invention that include a control portion.

FIG. 4A is a block diagram illustrating the structure of VOIP datagrams according to the present invention. As is shown, the VOIP datagrams include a datagram header 402, control information 404, and a VOIP payload 406. As will be described further with reference to FIGS. 6A, 6B, and 6C, the datagram header 402 and the VOIP payload 406 will vary depending upon the ISO protocol standard employed. Further, the control information 404 may vary from application to application. A particular embodiment of the control information will be described with reference to FIG. 4B.

Figure 4B:
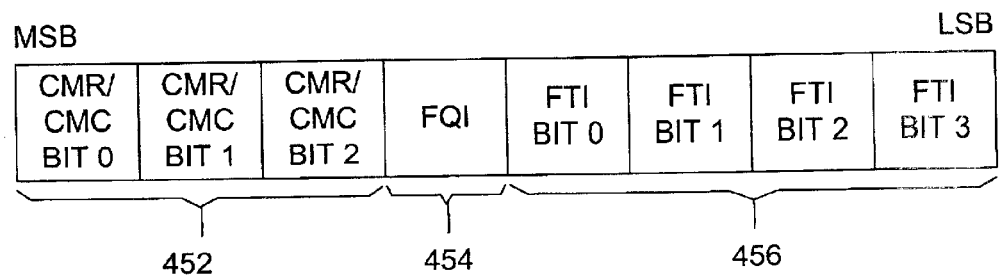
FIG. 4B is a block diagram illustrating the structure of control information octet of a VOIP datagram according to the present invention.

FIG. 4B is a block diagram illustrating the structure of control information octet of a VOIP datagram according to the present invention. The control information includes a three-bit CMR/CMC 452, a single bit FQI 454, and a four bit FTI 456. In order to support TX_TYPE and RX_TYPE speech functionality (i.e., SID), discontinuous transmissions (DTX) functionality, and rate adaptation over both the Um(GERAN)/Uu(UTRAN) (base station to mobile station wireless link) and Iu-ps (interface between base station and SGSN), a speech frame and SID frame format for the control information includes a Frame Type Index (FTI), a Frame Quality Indicator (FQI), and a command mode request/command mode command component.

Figure 5:
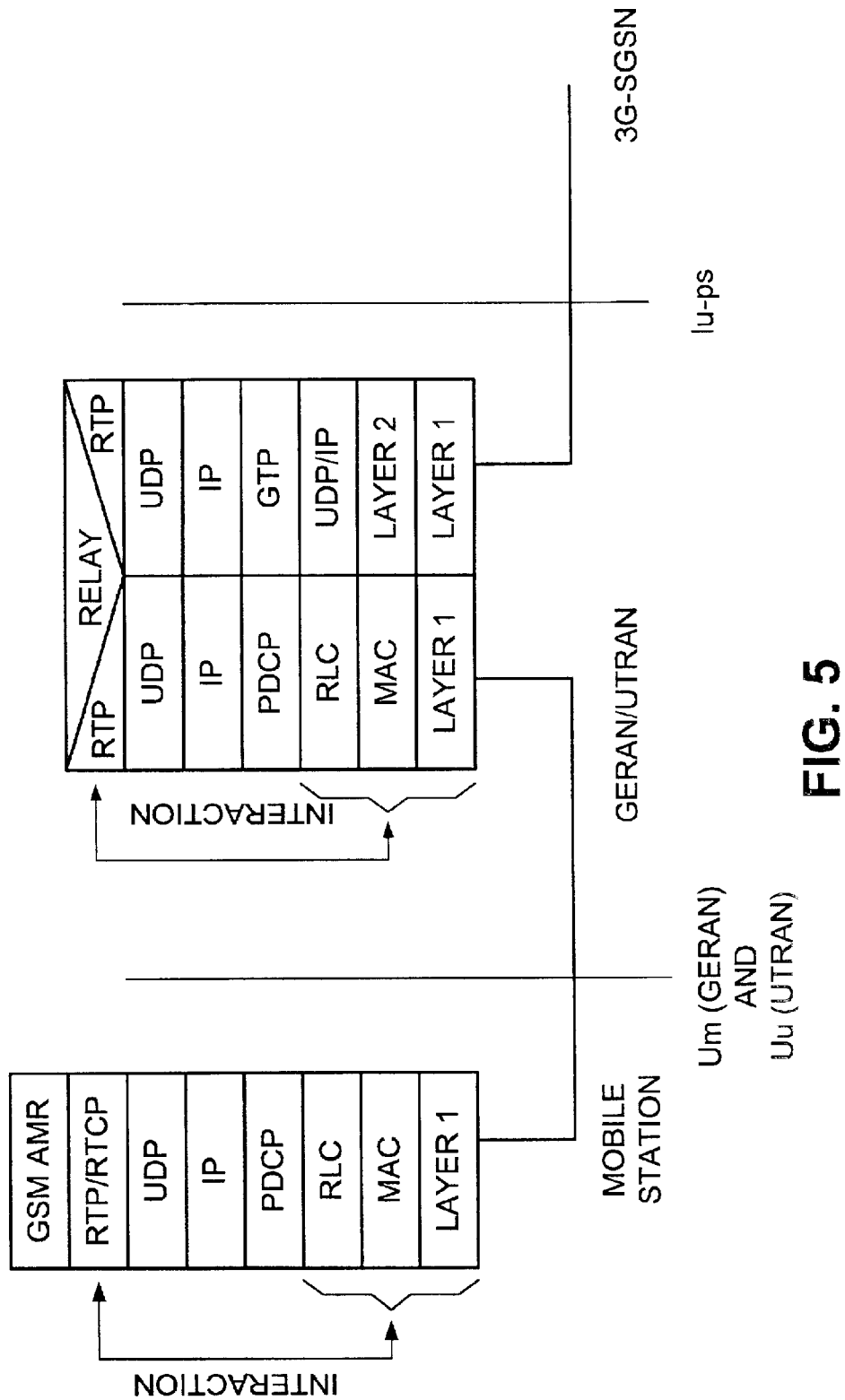
FIG. 5 is a block diagram illustrating ISO protocol stack components affected by the operation of the present invention.

FIG. 5 is a block diagram illustrating the ISO protocol stack components affected by the operation of the present invention. As shown, the ISO protocol stack resident upon the MS includes layer 1 (PHY layer), a Media Access Control (MAC) layer, a Radio Link Control (RLC) layer, a PDCP layer, an IP layer, a UDP layer, an RTP/RTCP layer and a GSM AMR CODEC application that rides above the RTP/RTCP. This protocol stack interfaces with the GERAN/UTRAN base station via the Um/Uu interface (wireless link).

Resident upon the GERAN/UTRAN base station to service the Um/Uu interface are layer 1, a MAC layer, a RLC layer, a PDCP layer, an IP layer, a UDP layer, and an RTP layer that interface the GERAN/UTRAN base station to the MS via the Um link. A relaying function relays this information to a protocol stack employed to service the Iu-ps wired interface between the GERAN/UTRAN base station and the 3G-SGSN. This protocol stack includes layer 1, layer 2, a UDP/IP layer, a GTP layer, an IP layer, a UDP layer, and an RTP layer. The GTP is a tunnel control and management protocol, which allows the SGSN to provide GPRS network access for an MS.

As is shown, interaction between the RLC/MAC/PHY layers and the RTP/RTCP is required for altering of the control information according to the present invention. With respect to the GERAN/UTRAN base station, the base station may alter the control information on either the uplink or the downlink. On the downlink, the base station may change the CMC in order to alter the data rate commanded in the VOIP datagram. On the uplink, the base station may toggle the FQI when the reverse link (uplink) has caused a respective VOIP payload to be corrupted. The MS may also alter the control information for downlink transmissions by altering the FQI when the MS determines that the VOIP payload has been corrupted by a faltering wireless forward link. Other network/mobile elements may also alter the FQI bit depending upon where the implementation of the error detection scheme takes place (i.e., whether it takes place in the transport, network, or RLC/MAC/PHY layers)

Referring now to both FIGS. 4B and 5, the manner in which the control information is set and modified is described. Table 1 describes the FTI 452 and the manner in which the VOIP terminals and/or base station participating in the VOIP call set it.

TABLE 1

| 4-bit Frame Type Index (FTI) | |
| --- | --- |
| Frame Type Index (FTI) | Frame content (e.g., GSM AMR CODEC mode, comfort noise, or other) |
| 0 | 4.75 kbit/s |
| 1 | 5.15. kbit/s |
| 2 | 5.90 kbit/s |
| 3 | 6.70 kbit/s |
| 4 | 7.40 kbit/s |

TABLE 1-continued

| 4-bit Frame Type Index (FTI) | |
| --- | --- |
| Frame Type Index (FTI) | Frame content (e.g., GSM AMR CODEC mode, comfort noise, or other) |
| 5 | 7.95 kbit/s |
| 6 | 10.2 kbit/s |
| 7 | 12.2 kbit/s |
| 8 | GSM AMR CODEC Comfort Noise Frame |
| 9 | GSM EFR Comfort Noise Frame |
| 10 | IS-641 Comfort Noise Frame |
| 11 | PDC EFR Comfort Noise Frame |
| 12–14 | For future use |
| 15 | No transmission/No reception |

Table 2 describes the FQI 454 and the manner in which the VOIP terminals and/or base station participating in the VOIP call set it.

TABLE 2

| 1-bit Frame Quality Indicator (FQI) | |
| --- | --- |
| Frame Quality Indicator (FQI) | Quality of data |
| 0 | Corrupted frame (bits may be used to assist error concealment) |
| 1 | Good frame |

The FQI and the FTI are related to TX_TYPE and RX_TYPE functionality of prior circuit switched communications as indicated in Table 3.

TABLE 3

| Mapping of FQI and FTI to TX_TYPE and RX_TYPE | | | |
| --- | --- | --- | --- |
| Frame Quality Indicator (FQI) | Frame Type Index (FTI) | TX_TYPE or RX_TYPE | Comment |
| 1 | 0–7 | SPEECH_GOOD | The specific FTI depends upon the mode being used |
| 0 | 0–7 | SPEECH_BAD | The specific FTI depends upon the mode being used. The corrupted data may be used to assist error concealment. |
| 1 | 8 | SID_FIRST or SID_UPDATE | SID_FIRST and SID_UPDATE are differentiated using Class A bits. |
| 0 | 8 | SID_BAD | |
| 1 | 9–11 | SID_UPDATE | |
| 0 | 9–11 | SID_BAD | |
| 1 | 15 | NO_DATA | Typically, a non-transmitted frame or an erased or stolen frame with no data usable to assist error concealment. |

Table 4 describes the FTI 456 and the manner in which the VOIP terminals and/or base station participating in the VOIP call set it.

TABLE 4

3-bit Code Mode Request (CMR) and Code Mode Command (CMC)

| Code Mode Request (CMR) or Code Mode Command (CMC) | GMS AMR CODEC mode |
|---|---|
| 0 | 4.75 kbit/s |
| 1 | 5.15. kbit/s |
| 2 | 5.90 kbit/s |
| 3 | 6.70 kbit/s |
| 4 | 7.40 kbit/s |
| 5 | 7.95 kbit/s |
| 6 | 10.2 kbit/s |
| 7 | 12.2 kbit/s |

The teachings of the present invention are applied to at least three Radio Access Bearers (RABs), Radio Access Bearer 0 (RAB0), Radio Access Bearer 1 (RAB1), and Radio Access Bearer 2 (RAB2). RAB0 is a voice-optimized RAB. For RAB0, the RTP/UDP/IP header is removed at the GERAN/UTRAN on the downlink and the RTP/UDP/IP header is constructed at the GERAN/UTRAN on the uplink. For RAB0, the control information (i.e., octet 0) is required only for the Iu-ps interface and the core network interfaces. RAB1 is a voice RAB with RTP/UDP/IP header compression. For RAB1, the control information is required for the Um/Uu, Iu-ps, and core network interfaces. RAB2 is a voice RAB with a full RTP/UDP/IP header. For RAB2, the control information is required for the Um/Uu, Iu-ps, and core network interfaces.

Rules for Setting the Control Information over the Um Interface

When GSM AMR CODEC speech frames or SID frames encapsulated in RTP/UDP/IP datagrams are transmitted by an MS on the uplink, FQI is always set to 1 (i.e., only SPEECH_GOOD, SID_FIRST, SID_UPDATE, or NO_DATA are used as QoS indicators). There is no need to give any other indication of QoS since no corruption due to channel fading conditions could have occurred at this point.

For the downlink, once the MS has determined QoS based upon the CRC and the information bits associated with an RTP/UDP/IP datagram comprising GSM AMR CODEC speech frames or SID frames, FQI can be set either to 1 (i.e., only SPEECH_GOOD, SID_FIRST, SID_UPDATE, or NO_DATA are used as QoS indicators) or 0 (i.e., only SPEECH_BAD or SID_BAD are used as QoS indicators). In other words, if the MS determines that the RTP/UDP/IP datagram contains corrupted speech frames or SID frames, it must toggle FQI (i.e., reset it to 0) in order to provide an indication of QoS if the GERAN/UTRAN base station had originally transmitted FQI=1. This will make it possible to employ speech frame substitution.

When the GSM AMR CODEC speech frames or SID frames encapsulated in RTP/UDP/IP datagrams are transmitted by the GERAN/UTRAN base station on the downlink, FQI can be set either to 1 (i.e., only SPEECH_GOOD, SID_FIRST, SID_UPDATE, or NO_DATA are used as QoS indicators) or 0 (i.e., only SPEECH_BAD or SID_BAD are used as QoS indicators) in order to give some indication of QoS. This FQI=0 indication of QoS would be based upon on the CRC and the information bits observed by, for example, another GERAN/UTRAN or a UTRAN which would have had to toggle FQI (i.e., reset it to 0) for a particular speech frame or SID frame. This will make it possible to employ speech frame substitution.

For valid receipt of Speech Frames or SID Frames on the Uplink by a GERAN/UTRAN base station, the FQI must be set to 1. For both the uplink and downlink, FTI can be set to 0–8. For both the uplink and downlink, CMR/CMC can be set to 0–7. However, for the downlink, a GERAN/UTRAN base station receiving a speech frame or SID frame from another base station may have to change CMC based upon its own C/I measurements. This would be true for both VOIP-to-VOIP (GERAN/UTRAN base station PS domain) calls and VOIP (GERAN/UTRAN base station PS domain)-to-VOIP (UTRAN PS domain) calls since there would be no need for either an H.323 gatekeeper or SIP proxy to setup these calls through a transcoding proxy located in the Core Network (perhaps in the vicinity of the GGSN and MGW). This is an architecture issue.

Rules for Setting the Control Information Over the Iu-ps Interface

The following rules are to be used when setting the control information over the Um interface for RAB0, RAB1, and RAB2:

For GERAN/UTRAN base station transmission of speech Frames or SID Frames to the SGSN, once the GERAN/UTRAN has determined QoS based upon the CRC and the information bits associated with an RTP/UDP/IP datagram comprising GSM AMR CODEC speech frames or SID frames, FQI can be set either to 1 (i.e., only SPEECH_GOOD, SID_FIRST, SID_UPDATE, or NO_DATA are used as QoS indicators) or 0 (i.e., only SPEECH_BAD or SID_BAD are used as QoS indicators). In other words, if the GERAN/UTRAN determines that the RTP/UDP/IP datagram contains corrupted speech frames or SID frames, it must toggle FQI (i.e., reset it to 0) in order to provide an indication of QoS. This will make it possible to employ speech frame substitution.

For GERAN/UTRAN base station reception of speech frames or SID frames from SGSN, FQI can be set either to 1 or 0. For both the uplink and downlink, FTI can be set to 0–8 or 15. For both the uplink and downlink, CMR/CMC can be set to 0–7.

Figure 6A:
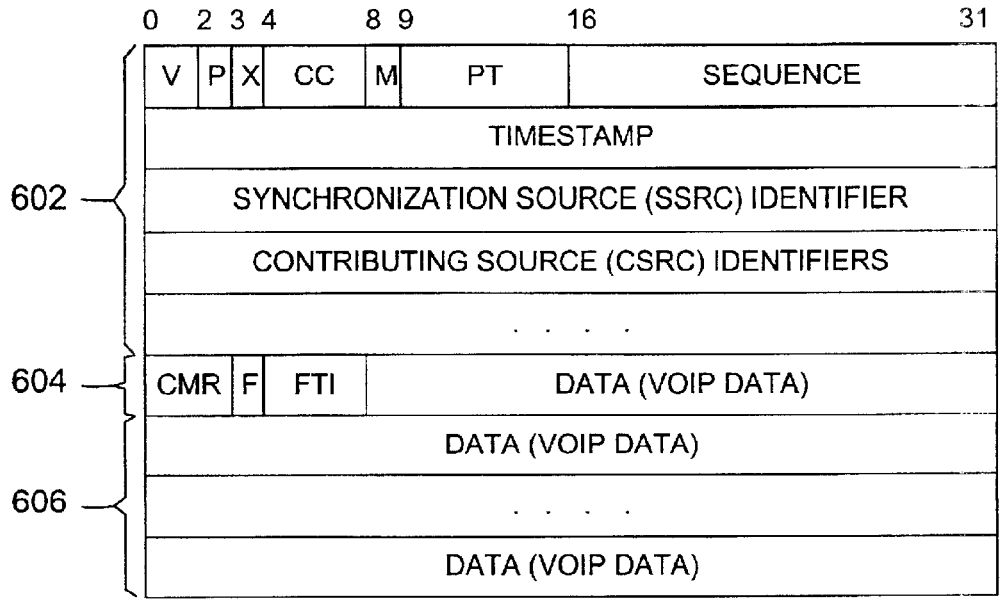
FIG. 6A is a block diagram illustrating the structure of a Real Time Protocol (RTP) VOIP datagram constructed according to the present invention that services a VOIP telephony call.

FIG. 6A is a block diagram illustrating the structure of a Real Time Protocol (RTP) VOIP datagram constructed according to the present invention that services a VOIP telephony call. As shown, the RTP VOIP datagram includes header information 602, control information 604 according to the present invention, and a VOIP payload 606 (and a portion of 604). According to the structure of the control information described with reference to FIG. 4B, the control information occupies the first 8 bits of the VOIP payload.

Figure 6B:
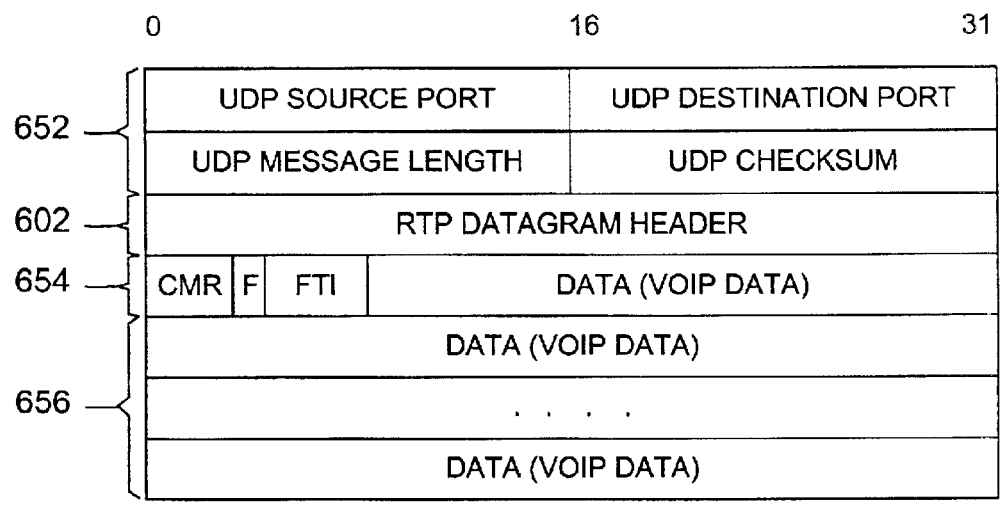
FIG. 6B is a block diagram illustrating the structure of a User Datagram Protocol (UDP) VOIP datagram constructed according to the present invention that services a VOIP telephony call.

FIG. 6B is a block diagram illustrating the structure of a User Datagram Protocol (UDP) VOIP datagram constructed according to the present invention that services a VOIP telephony call. The UDP datagram includes a header 652, an RTP datagram header 602 (as was described with reference to FIG. 6A), control information 654, and a VOIP payload 656. The structure of the control information illustrated in FIG. 6B is similar/the same as the control information described with reference to FIG. 4B.

Figure 7:
FIG. 7 is a block diagram illustrating the structure of an Internet Protocol (IP) VOIP datagram constructed according to the present invention that services a VOIP telephony call.

FIG. 7 is a block diagram illustrating the structure of an Internet Protocol (IP) VOIP datagram constructed according to the present invention that services a VOIP telephony call. The UDP datagram includes a header 702 and a UDP datagram 704 as was described with reference to FIG. 6B. The structure of the control information illustrated in FIG. 7 is similar/the same as the control information described with reference to FIG. 4B.

Figure 8:
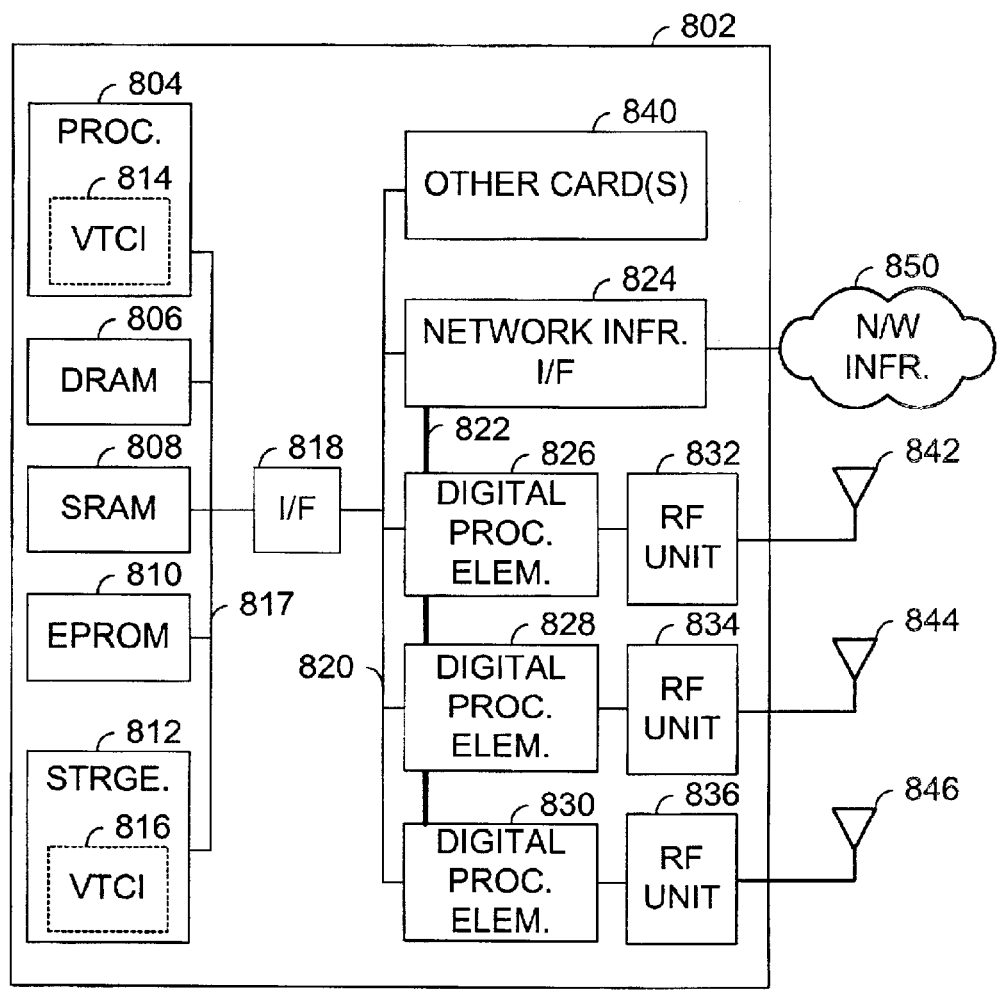
FIG. 8 is a block diagram illustrating a base station constructed according to the present invention.

FIG. 8 is a block diagram illustrating a base station 802 constructed according to the present invention. FIG. 8 is a block diagram illustrating a base station 802 constructed according to the present invention that performs the operations previously described herein. The base station 802 supports an operating protocol, e.g., IS-95A, IS-95B, IS-2000, 3GPP, GSM-EDGE, and/or various 3G and 4G standards, that is, or has been modified to be compatible with the teachings of the present invention. However, in other embodiments, the base station 802 supports other operating standards.

Figure 9:
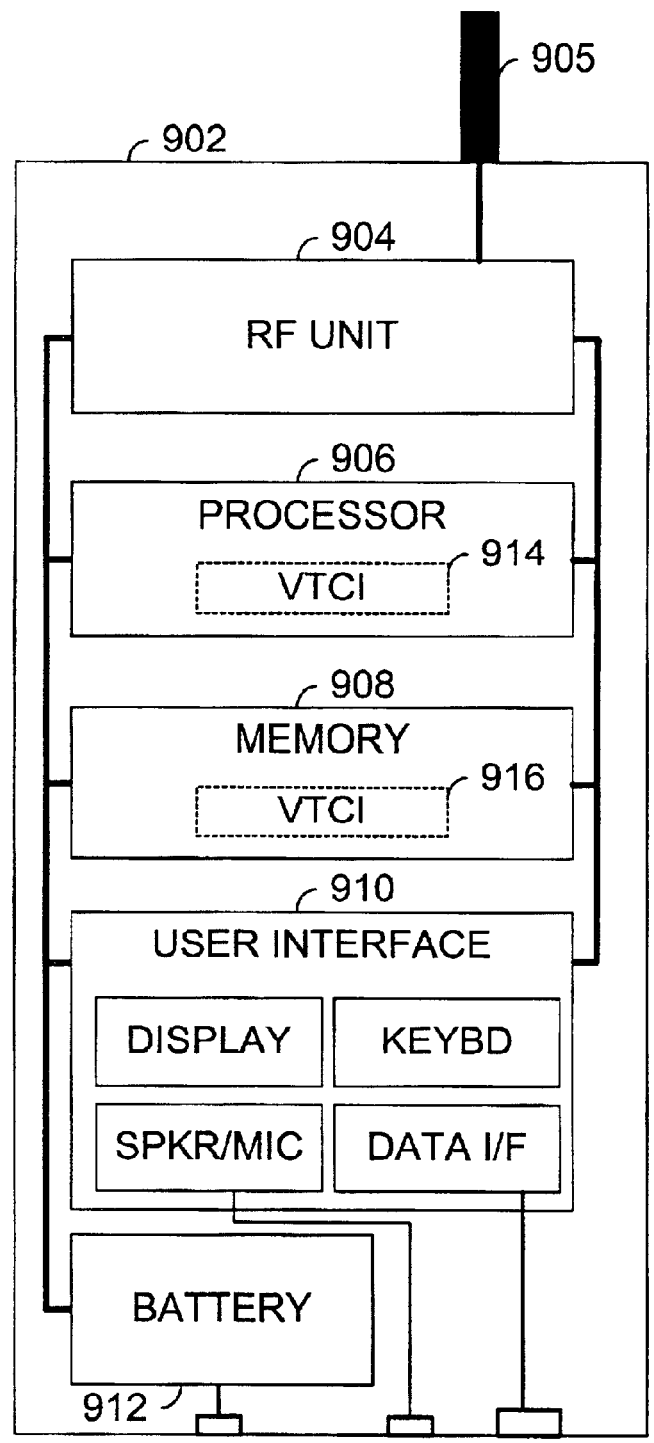
FIG. 9 is a block diagram illustrating a mobile station constructed according to the present invention.

The base station 802 includes a processor 804, dynamic RAM 806, static RAM 808, Flash memory, EPROM 810 and at least one data storage device 812, such as a hard drive, optical drive, tape drive, etc. These components (which may be contained on a peripheral processing card or module) intercouple via a local bus 817 and couple to a peripheral bus 820 (which may be a back plane) via an interface 818. Various peripheral cards couple to the peripheral bus 820. These peripheral cards include a network infrastructure interface card 824, which couples the base station 802 to the wireless network infrastructure 850. Digital processing cards 826, 828, and 830 couple to Radio Frequency (RF) units 832, 834, and 836, respectively. Each of these digital processing cards 826, 828, and 830 performs digital processing for a respective sector, e.g., sector 1, sector 2, or sector 3, serviced by the base station 802. Thus, each of the digital processing cards 826, 828, and 830 will perform some or all of processing operations described with reference to FIGS. 6 and 7. The RF units 832, 834, and 836 couple to antennas 842, 844, and 846, respectively, and support wireless communication between the base station 802 and mobile stations (the structure of which is shown in FIG. 9). The base station 802 may include other cards 840 as well.

VOIP Telephony Control Instructions (VTCI) 816 are stored in storage 812. The VTCI 816 are downloaded to the processor 804 and/or the DRAM 806 as VTCI 814 for execution by the processor 804. While the VTCI 816 are shown to reside within storage 812 contained in base station 802, the VTCI 816 may be loaded onto portable media such as magnetic media, optical media, or electronic media. Further, the VTCI 816 may be electronically transmitted from one computer to another across a data communication path. These embodiments of the VTCI are all within the spirit and scope of the present invention. Upon execution of the VTCI 814, the base station 802 performs operations according to the present invention previously described herein in managing a VOIP telephone call. The VTCI 816 may also be partially executed by the digital processing cards 826, 828, and 830 and/or other components of the base station 802. Further, the structure of the base station 802 illustrated is only one of many varied base station structures that could be operated according to the teachings of the present invention.

FIG. 9 is a block diagram illustrating a mobile station 902 constructed according to the present invention that performs the operations previously described herein. The mobile station 902 supports a CDMA operating protocol, e.g., IS-95A, IS-95B, IS-2000, and/or various 3G and 4G standards that is, or has been modified to be compatible with the teachings of the present invention. However, in other embodiments, the mobile station 902 supports other operating standards.

The mobile station 902 includes an RF unit 904, a processor 906, and a memory 908. The RF unit 904 couples to an antenna 905 that may be located internal or external to the case of the mobile station 902. The processor 906 may be an Application Specific Integrated Circuit (ASIC) or another type of processor that is capable of operating the mobile station 902 according to the present invention. The memory 908 includes both static and dynamic components, e.g., DRAM, SRAM, ROM, EEPROM, etc. In some embodiments, the memory 908 may be partially or fully contained upon an ASIC that also includes the processor 906. A user interface 910 includes a display, a keyboard, a speaker, a microphone, and a data interface, and may include other user interface components. The RF unit 904, the processor 906, the memory 908, and the user interface 910 couple via one or more communication buses/links. A battery 912 also couples to and powers the RF unit 904, the processor 906, the memory 908, and the user interface 910.

VOIP Telephony Control Instructions (VTCI) 916 are stored in memory 908. The VTCI 916 are downloaded to the processor 906 as VTCI 914 for execution by the processor 906. The VTCI 916 may also be partially executed by the RF unit 904 in some embodiments. The VTCI 916 may be programmed into the mobile station 902 at the time of manufacture, during a service provisioning operation, such as an over-the-air service provisioning operation, or during a parameter updating operation. The structure of the mobile station 902 illustrated is only an example of one mobile station structure. Many other varied mobile station structures could be operated according to the teachings of the present invention. Upon execution of the VTCI 914, the mobile station 902 performs operations according to the present invention previously described herein in servicing a VOIP telephony call.

Figure 10:
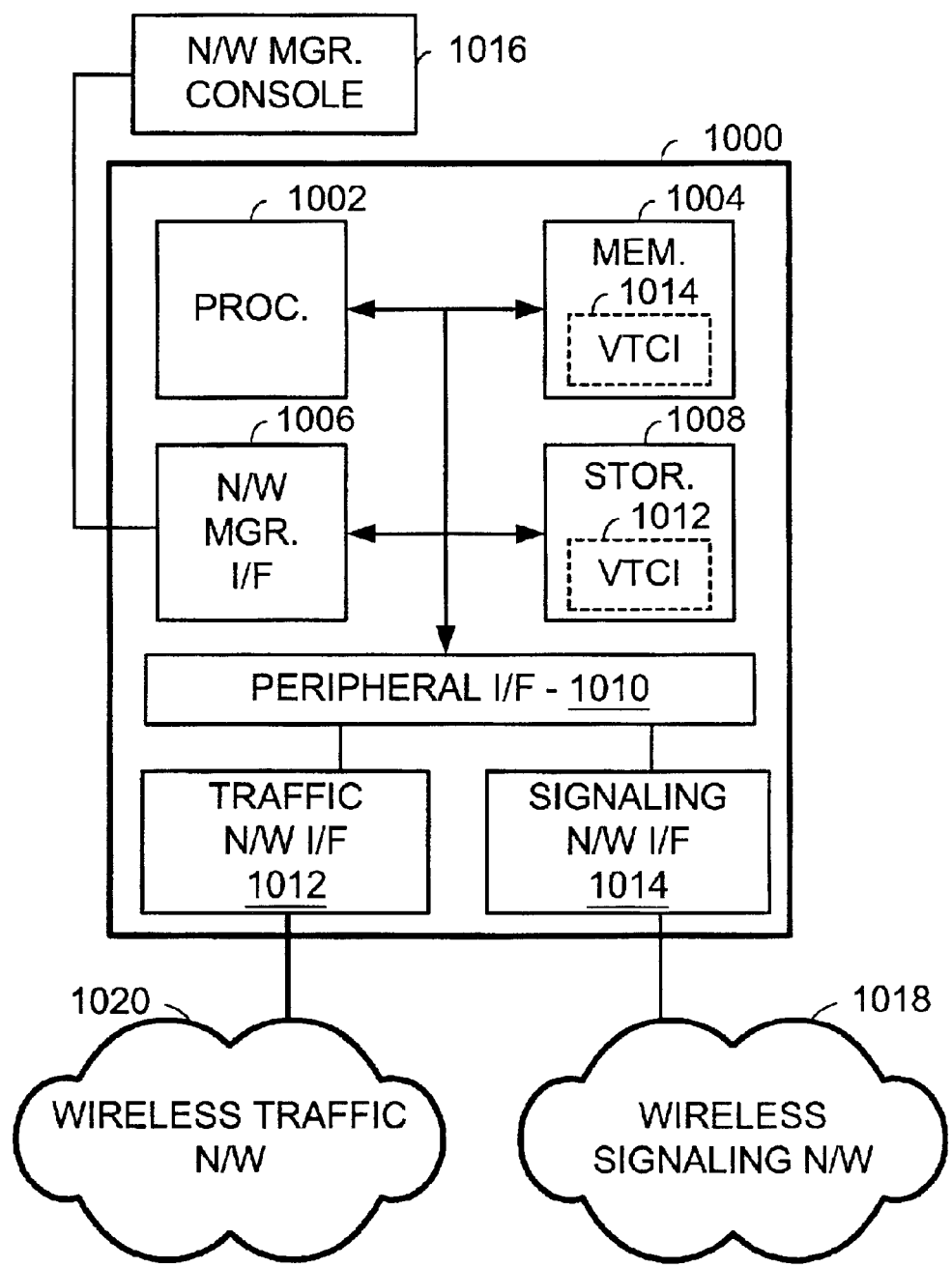
FIG. 10 is a block diagram illustrating a computer that may serve an Interworking Function, a Media Gateway, a VOIP Gateway, or an IP telephony terminal according to the present invention.

FIG. 10 is a block diagram illustrating a computer 1000 that may serve an Interworking Function, a Media Gateway, a VOIP Gateway, or an IP telephony terminal according to the present invention. The computer 1000 may be general-purpose computer that has been programmed and/or otherwise modified to perform the particular operations described herein. However, the computer 1000 may be specially constructed to perform the operations described herein. The computer 1000 instantiates an Interworking Function, a Media Gateway Function, a VOIP Gateway function, or an IP telephony terminal, each of which were described with reference to FIGS. 1, 2 and/or 3. The computer 1000 performs additional functions as well that are generally known in the art.

The computer 1000 includes a processor 1002, memory 1004, a network manager interface 1006, storage 1008 and a peripheral interface 1010, all of which intercouple via a processor bus. The processor 1002 may be a microprocessor or another type of processor that executes software instructions to accomplish programmed functions. The memory 1004 may include DRAM, SRAM, ROM, PROM, EPROM, EEPROM, or another type of memory in which digital information may be stored. The storage 1008 may include magnetic disk storage, magnetic tape storage, optical storage, or any other type of device, which is capable of storing digital instructions and data.

The network manager interface 1006 couples to a network manager console 1016. The network manager console 1016 may be a keypad/display or may be a more complex device, such as a personal computer, which allows the manager to interface with the computer 1000. However, the network manager may interface with the computer 1000 using other techniques as well, e.g., via a card coupled to the peripheral interface 1010.

The peripheral interface 1010 couples to a wireless network interface 1018 and to a signaling network interface 1014. The traffic network interface 1012 couples the computer 1000 to the wireless traffic network 1020. The signaling network interface 1014 couples the computer 1000 to a signaling network 1018 of the coupled wireless network.

VOIP Telephony Control Instructions (VTCI) 1012 are loaded into the storage 1008 of the computer 1000. Upon their execution, at least some of the VTCI 1012 are downloaded into memory 1004 and/or the processor 1002 (as VTCI 1014). The processor 1002 then executes the VTCI 1014 to cause the computer 1000 to perform according to the present invention. The programming and operation of digital computers is generally known. Thus, the manners in which the processor 1002 and the other components of the computer 1000 perform these operations are not further described herein.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method of operating a mobile terminal to support a Voice Over Internet Protocol (VOIP) telephony call, the method comprising:

receiving a voice signal from a user;

determining a data rate to be employed for encoding the voice signal;

encoding the voice signal at the data rate to create a VOIP payload;

creating a VOIP datagram that includes a header, control information, and the VOIP payload, wherein the control information includes a command mode request, a frame quality index, and a frame type index; and transmitting the VOIP datagram on a reverse wireless link to a base station of a wireless network.

2. The method of claim 1, wherein the command mode request indicates a data rate at which the base station desires to receive a VOIP payload of a VOIP datagram received from the base station across a forward wireless link.

3. The method of claim 1, wherein the frame quality index is set to indicate that the VOIP payload is valid.

4. The method of claim 1, wherein the frame type index indicates a data rate of the VOIP payload.

5. The method of claim 1, wherein:

the VOIP payload is silent; and the frame type index indicates that the VOIP payload is silent.

6. The method of claim 1, wherein the control information is located in the VOIP datagram between the header and the VOIP payload.

7. The method of claim 6, wherein the control information includes eight bits.

8. The method of claim 7, wherein:

the command mode request comprises three bits;

the frame quality index comprises one bit; and the frame type index comprises four bits.

9. The method of claim 1, wherein the data rate is based upon a command received from the base station.

10. The method of claim 1, wherein the data rate is based upon the quality of a wireless link between the mobile station and the base station.

11. A method of operating a mobile terminal to support a Voice Over Internet Protocol (VOIP) telephony call, the method comprising:

receiving a VOIP datagram on a forward link from a base station on a wireless forward link, wherein the VOIP datagram includes a header, control information, and the VOIP payload, wherein the control information includes a command mode request, a frame quality index, and a frame type index;

determining, from the control information, a data rate to be employed for decoding the VOIP payload;

determining, from the control information, whether the VOIP payload has been corrupted in its transmission from the base station on the wireless forward link;

when the VOIP payload has not been corrupted, decoding the VOIP payload at the data rate to create a voice signal and presenting the voice signal to the user; and when the VOIP payload has been corrupted, performing error recovery operations to present another voice signal to the user.

12. The method of claim 11, further comprising creating a subsequent VOIP datagram at a data rate based upon the command mode request.

13. The method of claim 11, further comprising:

determining, at a lower protocol layer, that the VOIP payload has been corrupted; and setting the frame quality indicator of the higher protocol layer VOIP datagram control information to indicate that the VOIP payload has been corrupted.

14. The method of claim 11, wherein the frame type index indicates a data rate of the VOIP payload.

15. The method of claim 11, wherein:

the VOIP payload is silent; and the frame type index indicates that the VOIP payload is silent.

16. The method of claim 11, wherein the control information is located in the VOIP datagram between the header and the VOIP payload.

17. The method of claim 16, wherein the control information includes eight bits.

18. The method of claim 17, wherein:

the command mode request comprises three bits;

the frame quality index comprises one bit; and the frame type index comprises four bits.

19. The method of claim 11, wherein the data rate is based upon the quality of a wireless link between the mobile station and the base station.

20. The method of claim 11, wherein the data rate is based upon available wireless link resources of the base station.

21. A method of operating a base station to support a Voice Over Internet Protocol (VOIP) telephony call, the method comprising:

receiving a VOIP datagram from a mobile station on a reverse wireless link, wherein the VOIP datagram includes a header, control information, and the VOIP payload, wherein the control information includes a command mode request, a frame quality index, and a frame type index;

wherein the command mode request indicates a requested data rate for the VOIP payload of a subsequent VOIP datagram to be transmitted to the mobile station;

determining a different data rate for the VOIP payload of a subsequent VOIP datagram to be transmitted to the mobile station;

altering the command mode request to indicate the different data rate; and forwarding the VOIP datagram to a VOIP terminal.

22. The method of claim 21, further comprising:

determining that the VOIP payload has been corrupted on the reverse wireless link; and setting the frame quality indicator to indicate the corrupted VOIP payload.

23. The method of claim 21, wherein the frame type index indicates a data rate of the VOIP payload.

24. The method of claim 21, wherein:

the VOIP payload is silent; and the frame type index indicates that the VOIP payload is silent.

25. The method of claim 21, wherein the control information is located in the VOIP datagram between the header and the VOIP payload.

26. The method of claim 25, wherein the control information includes eight bits.

27. The method of claim 26, wherein:

the command mode request comprises three bits;

the frame quality index comprises one bit; and the frame type index comprises four bits.

28. The method of claim 21, wherein the different data rate is based upon the quality of a wireless link between the mobile station and the base station.

29. The method of claim 21, wherein the different data rate is based upon the wireless link requirements of the base station.

30. The method of claim 21, wherein the VOIP datagram control information is altered based upon information obtained from a lower protocol layer.

31. A method of operating a base station to support a Voice Over Internet Protocol (VOIP) telephony call, the method comprising:

receiving a VOIP datagram from a VOIP terminal, wherein the VOIP datagram includes a header, control information, and the VOIP payload, wherein the control information includes a command mode request, a frame quality index, and a frame type index;

wherein the VOIP datagram is to be transmitted to a mobile terminal on a forward wireless link;

wherein the command mode request indicates a commanded data rate for the VOIP payload of a subsequent VOIP datagram to be received from the mobile station on a reverse wireless link;

determining a different data rate for the VOIP payload of the subsequent VOIP datagram;

altering the command mode request to indicate the different data rate; and forwarding the VOIP datagram to the mobile station on the forward wireless link.

32. The method of claim 31, wherein the frame type index indicates a data rate of the VOIP payload.

33. The method of claim 31, wherein:

the VOIP payload is silent; and the frame type index indicates that the VOIP payload is silent.

34. The method of claim 31, wherein the control information is located in the VOIP datagram between the header and the VOIP payload.

35. The method of claim 34, wherein the control information includes eight bits.

36. The method of claim 35, wherein:

the command mode request comprises three bits;

the frame quality index comprises one bit; and the frame type index comprises four bits.

37. The method of claim 31, wherein the different data rate is based upon the quality of a wireless link between the mobile station and the base station.

38. The method of claim 31, wherein the different data rate is based upon the wireless link requirements of the base station.

39. A mobile station that supports Voice Over Internet Protocol (VOIP) telephony, the base station comprising:

an antenna;

a Radio Frequency unit coupled to the antenna; and at least one digital processor coupled to the Radio Frequency unit that executes software instructions causing the mobile station to:

receive a voice signal from a user;

determine a data rate to be employed for encoding the voice signal;

encode the voice signal at the data rate to create a VOIP payload;

create a VOIP datagram that includes a header, control information, and the VOIP payload, wherein the control information includes a command mode request, a frame quality index, and a frame type index; and transmit the VOIP datagram on a reverse wireless link to a base station of a wireless network.

40. A mobile station that supports Voice Over Internet Protocol (VOIP) telephony, the base station comprising:

an antenna;

a Radio Frequency unit coupled to the antenna; and at least one digital processor coupled to the Radio Frequency unit that executes software instructions causing the mobile station to:

receive a VOIP datagram on a forward link from a base station on a wireless forward link, wherein the VOIP datagram includes a header, control information, and the VOIP payload, wherein the control information includes a command mode request, a frame quality index, and a frame type index;

determine, from the control information, a data rate to be employed for decoding the VOIP payload;

determine, from the control information, whether the VOIP payload has been corrupted in its transmission from the base station on the wireless forward link;

when the VOIP payload has not been corrupted, decode the VOIP payload at the data rate to create a voice signal and present the voice signal to the user; and when the VOIP payload has been corrupted, perform error recovery operations to present another voice signal to the user.

41. A base station that supports Voice Over Internet Protocol (VOIP) telephony, the base station comprising:

an antenna;

a Radio Frequency unit coupled to the antenna; and at least one digital processor coupled to the Radio Frequency unit that executes software instructions causing the mobile station to:

receive a VOIP datagram from a VOIP terminal, wherein the VOIP datagram includes a header, control information, and the VOIP payload, wherein the control information includes a command mode request, a frame quality index, and a frame type index;

wherein the VOIP datagram is to be transmitted to a mobile terminal on a forward wireless link;

wherein the command mode request indicates a commanded data rate for the VOIP payload of a subsequent VOIP datagram to be received from the mobile station on a reverse wireless link;

determine a different data rate for the VOIP payload of the subsequent VOIP datagram;

alter the command mode request to indicate the different data rate; and forward the VOIP datagram to the mobile station on the forward wireless link.

42. A base station that supports Voice Over Internet Protocol (VOIP) telephony, the base station comprising:

an antenna;

a Radio Frequency unit coupled to the antenna; and at least one digital processor coupled to the Radio Frequency unit that executes software instructions causing the mobile station to:

receive a VOIP datagram from a VOIP terminal, wherein the VOIP datagram includes a header, control information, and the VOIP payload, wherein the control information includes a command mode request, a frame quality index, and a frame type index;

wherein the VOIP datagram is to be transmitted to a mobile terminal on a forward wireless link;

wherein the command mode request indicates a commanded data rate for the VOIP payload of a subsequent VOIP datagram to be received from the mobile station on a reverse wireless link;

determine a different data rate for the VOIP payload of the subsequent VOIP datagram;

alter the command mode request to indicate the different data rate; and forward the VOIP datagram to the mobile station on the forward wireless link.

43. A plurality of software instructions stored on a media that, upon execution by a mobile station, cause the mobile station support Voice Over Internet Protocol (VOIP) telephony, the plurality of software instructions comprising:

a set of instructions executed by the mobile station that cause the mobile station to receive a VOIP datagram on a forward link from a base station on a wireless forward link, wherein the VOIP datagram includes a header, control information, and the VOIP payload, wherein the control information includes a command mode request, a frame quality index, and a frame type index;

a set of instructions executed by the mobile station that cause the mobile station to determine, from the control information, a data rate to be employed for decoding the VOIP payload;

a set of instructions executed by the mobile station that cause the mobile station to determine, from the control information, whether the VOIP payload has been corrupted in its transmission from the base station on the wireless forward link;

a set of instructions executed by the mobile station that cause the mobile station to, when the VOIP payload has not been corrupted, decode the VOIP payload at the data rate to create a voice signal and present the voice signal to the user; and a set of instructions executed by the mobile station that cause the mobile station to, when the VOIP payload has been corrupted, perform error recovery operations to present another voice signal to the user.

44. A plurality of software instructions stored on a media that, upon execution by a mobile station, cause the mobile station to support Voice Over Internet Protocol (VOIP) telephony, the plurality of software instructions comprising:

a set of instructions executed by the mobile station that cause the mobile station to receive a VOIP datagram on a forward link from a base station on a wireless forward link, wherein the VOIP datagram includes a header, control information, and the VOIP payload, wherein the control information includes a command mode request, a frame quality index, and a frame type index;

a set of instructions executed by the mobile station that cause the mobile station to determine, from the control information, a data rate to be employed for decoding the VOIP payload;

a set of instructions executed by the mobile station that cause the mobile station to determine, from the control information, whether the VOIP payload has been corrupted in its transmission from the base station on the wireless forward link;

a set of instructions executed by the mobile station that cause the mobile station to when the VOIP payload has not been corrupted, decode the VOIP payload at the data rate to create a voice signal and present the voice signal to the user; and a set of instructions executed by the mobile station that cause the mobile station to, when the VOIP payload has been corrupted, perform error recovery operations to present another voice signal to the user.

45. A plurality of software instructions stored on a media that, upon execution by a base station, cause the base station to support Voice Over Internet Protocol (VOIP) telephony, the plurality of software instructions comprising:

a set of instructions executed by the base station that cause the base station to receive a VOIP datagram from a VOIP terminal, wherein the VOIP datagram includes a header, control information, and the VOIP payload, wherein the control information includes a command mode request, a frame quality index, and a frame type index;

wherein the VOIP datagram is to be transmitted to a mobile terminal on a forward wireless link;

wherein the command mode request indicates a commanded data rate for the VOIP payload of a subsequent VOIP datagram to be received from the mobile station on a reverse wireless link;

a set of instructions executed by the base station that cause the base station to determine a different data rate for the VOIP payload of the subsequent VOIP datagram;

a set of instructions executed by the base station that cause the base station to alter the command mode request to indicate the different data rate; and a set of instructions executed by the base station that cause the base station to forward the VOIP datagram to the mobile station on the forward wireless link.

46. A plurality of software instructions stored on a media that, upon execution by a base station, cause the base station to support Voice Over Internet Protocol (VOIP) telephony, the plurality of software instructions comprising:

a set of instructions executed by the base station that cause the base station to receive a VOIP datagram from a VOIP terminal, wherein the VOIP datagram includes a header, control information, and the VOIP payload, wherein the control information includes a command mode request, a frame quality index, and a frame type index;

wherein the VOIP datagram is to be transmitted to a mobile terminal on a forward wireless link;

wherein the command mode request indicates a commanded data rate for the VOIP payload of a subsequent VOIP datagram to be received from the mobile station on a reverse wireless link;

a set of instructions executed by the base station that cause the base station to determine a different data rate for the VOIP payload of the subsequent VOIP datagram;

a set of instructions executed by the base station that cause the base station to alter the command mode request to indicate the different data rate; and a set of instructions executed by the base station that cause the base station to forward the VOIP datagram to the mobile station on the forward wireless link.

* * * * *

UNITED STATES PATENT AND TRADEMARK OFFICE
CERTIFICATE OF CORRECTION

PATENT NO.        : 6,839,356 B2
APPLICATION NO.   : 09/789435
DATED             : January 4, 2005
INVENTOR(S)       : Peter Barany et al.

It is certified that error appears in the above-identified patent and that said Letters Patent is hereby corrected as shown below:

Column 22, lines 12-13 (Claim 39, lines 1-2) should read
-- A mobile station that supports Voice Over Internet Protocol (VOIP) telephony, the mobile station comprising: --.

Column 22, lines 30-31 (Claim 40, lines 1-2) should read
-- A mobile station that supports Voice Over Internet Protocol (VOIP) telephony, the mobile station comprising: --.

Signed and Sealed this
First Day of January, 2013

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,839,356 B2 | |
| APPLICATION NO. | : 09/789435 | |
| DATED | : January 4, 2005 | |
| INVENTOR(S) | : Peter Barany et al. | |

It is certified that error appears in the above-identified patent and that said Letters Patent is hereby corrected as shown below:

Claim 10, Column 19, lines 65-67 should read

-- 10. The method of claim 1, wherein the data rate is based upon the quality of a wireless link between the mobile terminal and the base station. --

Claim 19, Column 20, lines 47-49 should read

-- 19. The method of claim 11, wherein the data rate is based upon the quality of a wireless link between the mobile terminal and the base station. --

Claim 31, Column 21, lines 46-49 should read

-- wherein the command mode request indicates a commanded data rate for the VOIP payload of a subsequent VOIP datagram to be received from the mobile terminal on a reverse wireless link; --

Signed and Sealed this
Second Day of April, 2013

Teresa Stanek Rea
*Acting Director of the United States Patent and Trademark Office*